May 19, 1970 L. S. TURNER Re. 26,882

ARROW-HELICOPTER TOY

Original Filed June 17, 1966

INVENTOR
LLOYD S. TURNER

BY Edward A. Robinson

ATTORNEY

United States Patent Office

Re. 26,882
Reissued May 19, 1970

26,882
ARROW-HELICOPTER TOY

Lloyd S. Turner, Los Gatos, Calif., assignor, by direct and mesne assignments, to Basic Products Development Company, Inc., Oakland, Calif., a corporation of California Original No. 3,390,480, dated July 2, 1968, Ser. No. 558,358, June 17, 1966. Application for reissue Nov. 21, 1968, Ser. No. 782,494
Int. Cl. A63h *27/14*
U.S. Cl. 46—75 3 Claims

Matter enclosed in heavy brackets [ ] appears in the original patent but forms no part of this reissue specification; matter printed in italics indicates the additions made by reissue.

ABSTRACT OF THE DISCLOSURE

This aerial toy includes a shaft-like body and a pair of wings formed of a single strip of pliable sheet material. The toy will ascend as an arrow with the wings extending to the rear, and with a rudder vane protruding through an opening in each wing. The wings with the rudder vanes protruding therethrough will provide arrow-like tail fins with mutually perpendicular surfaces for stable flight. The toy will descend as a helicopter with the wings curled outwardly away from the body.

*DESCRIPTION OF THE INVENTION*

This invention relates to an aerial toy that may be propelled upwardly into a first mode of flight as an arrow, and thence will descend as a helicopter.

It is an object of this invention to provide an improved aerial toy with a shaft-like elongated body and a pair of wing members which may extend rearwardly over a rudder to form arrow-like tail fins for the first mode of flight and then will curl outwardly from the shaft to form wings for the second mode of flight.

A further object is to provide an improved aerial toy wherein the wings are resilient and may be drawn straight to the rear to lie on opposite sides of a shaft or body with a rudder vane protruding through slotted openings in the wings to provide perpendicular surfaces forming tail fins and wherein the wings will tend to curl or spread outwardly from each other when the rearward-pulling forces and high-speed aerodynamic forces are decreased.

Other objects and advantages of this invention will be apparent throughout the progress of the specification which follows. The accompanying drawing illustrates a certain exemplary embodiment of this invention and the views thereof are as follows.

Figure 1:
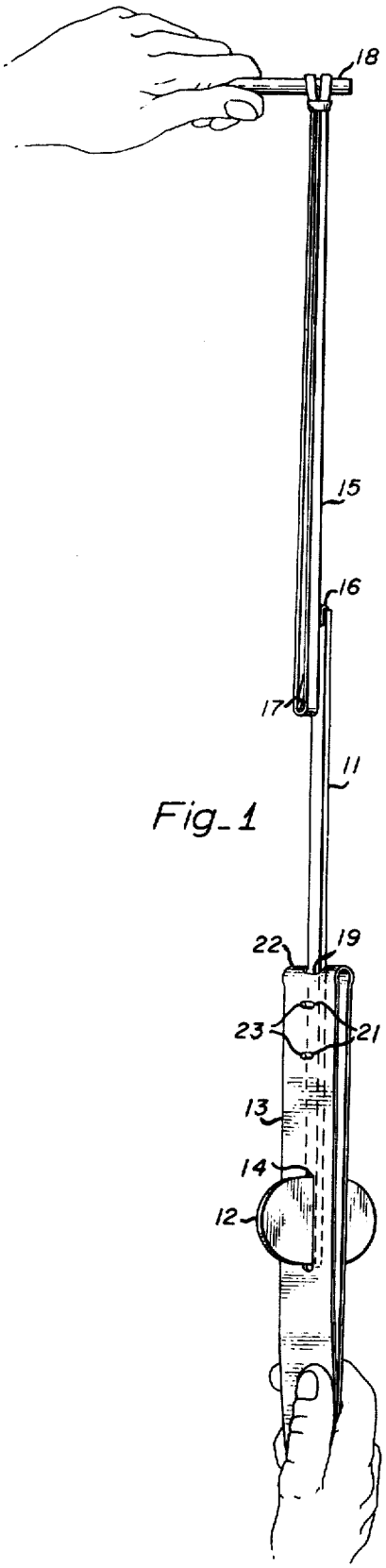
FIGURE 1 is a perspective view of the aerial toy of this invention with a rubber sling attached and held in preparation for launching.
Figure 2:
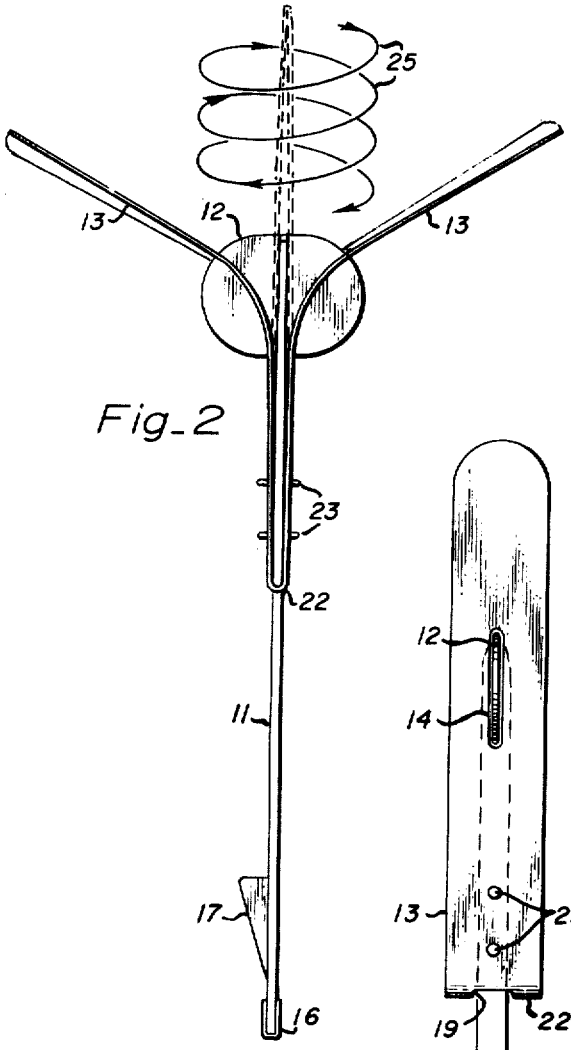
FIGURE 2 is a prospective view of the aerial toy with the wings curled outwardly and descending in a helicopter mode of flight.
Figure 3:
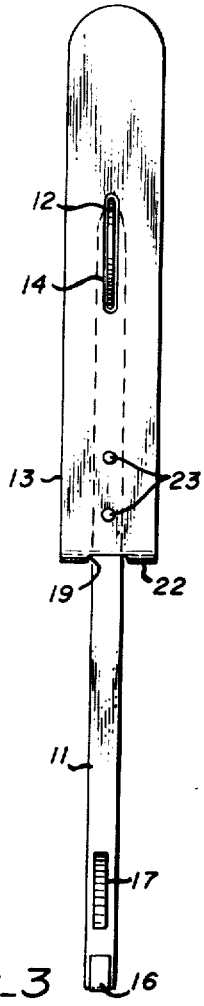
FIGURE 3 is a view with the wings flat and extending straight to the rear as in the arrow-like mode of flight.

Briefly stated, according to a preferred form of this invention, the aerial toy includes an elongated body or shaft 11, a pair of rudder vanes 12 extending outwardly from opposite sides of the rearward end of the shaft 11, and a pair of resilient wing members 13 normally curling outwardly from the shaft as shown in FIGURE 2. Each of the resilient wing members 13 is formed with a longitudinal, slotted opening 14 dimensioned to receive a rudder vane 12 which may thereby extend outwardly through the wing member. The aerial toy may be launched by a means such as a rubber sling or catapult 15 as shown in FIGURE 1. During launch, the wing members 13 may be drawn straight and to the rear with the rudder vanes 12 extending through the slots 14, therein to provide fin-like surfaces of a dart or arrow at the rear of the shaft 11. During the first mode of flight following the launching, the relatively great air speed and the relatively great aerodynamic forces continue to hold the wing members 13 taut and straight to the rear as shown in FIGURE 3. The combination of the straight wing members 13 and the rudder vanes 12 continue to form mutually perpendicular tail fins for the toy in an arrow-like flight. When the toy nears its apogee, or highest point in flight, the air speed and the aerodynamic forces are greatly reduced, and the natural resilience causes the wing members 13 to curl outwardly from the shaft 12 as shown in FIGURE 2. In addition to the outward curl, each wing member 13 may be twisted axially to a slight extent such that the toy will spin about the axis of the shaft 11 during a slow helicopter-like descent which constitutes the second mode of flight.

As shown in FIGURES 1, 2, and 3, the forward end of the shaft 11 may be provided with a metal tip or cap 16. The cap 16 shown by the drawing may be formed of a metal which is somewhat malleable or deformable. The cap 16 is merely folded and crimped over the forward end of the shaft 11. This metal tip 16 performs two important functions in the operation of the aerial toy.

Firstly, the addition of the metal tip weights the forward end of the shaft, thereby shifting the center of gravity forward with respect to the center of pressure of the toy to stabilize the flight thereof. In the first mode of flight, the toy resembles an arrow, since the forward tip 16 is weighted and since the rearward end has fins including the rudder vanes 12 and the wing members 13, extending straight to the rear. In the second mode of flight, the weighted forward end of the shaft hangs downwardly below the curled wing members to provide stability as the toy descends.

The second important function of the metal tip 16 is to protect the shaft upon impact with the ground or with an obstacle. Regardless of which mode of flight the toy has assumed, the metal tip 16, at the forward end of the shaft will receive the impact of a collision and, being of metal, the tip will protect the shaft from splintering or otherwise fracturing.

As shown in FIGURES 1, 2, and 3, a wedge-shaped hook 17 is formed integrally with the shaft 11. The hook 17 is positioned near the forward end of the shaft 11, just rearward of the metal tip 16. The hook 17 is dimensioned to receive the rubber band 15 of the catapult or sling and constitutes a launching means.

FIGURE 1 shows the toy being launched. A simple sling comprises a rubber band 15, knotted or otherwise attached to a short stick or handle 18. The stick 18 is grasped by one hand while the wing members 13 are grasped by the other hand. The hands are drawn apart to stretch the rubber band 15, and then the toy is released by the hand holding the wing members, whereupon the top is catapulted forward and launched in the arrow-like mode of flight.

In a preferred embodiment, the aerial toy of this invention may be molded from plastic such that the rudder vanes 12 are formed integrally with the shaft or body 11. An alternative method of manufacture may provide that the body 11 may be a shaft of wood that is notched or slotted at the rearward end to receive a disc-shaped rudder member which may be inserted and held by glue or the like.

The wing members 13 may be formed from a single strip of sheet material such as a vinyl plastic. A hole 19 may be punched or otherwise formed in the center of the plastic strip, and further holes 21 may be formed, spaced longitudinally from the central hole 19. If a thermal plastic is used, the strip may be heated and folded at the mid-point hole 19 to provide a bend 22 back upon itself, from which the two wing members may extend rearwardly. The toy is assembled by inserting the shaft 11 through the hole 19 such that the wings extend rearwardly from a point near the midpoint of the shaft 11. Thus, it may be appreciated that the two wing members 13 may be formed from a single strip of sheet plastic that has been folded about a centrally positioned hole for receiving the shaft body.

In one embodiment of this invention, integrally formed studs 23 protrude from opposite sides of the shaft 11. The holes 21 are dimensioned to receive the studs 23 which are simply pressed into the holes 21. In other embodiments of this invention, the wing members 13 may be attached by rivets. In another embodiment using thermal plastics, appropriate spots of the wing members 13 and the shaft member 11 may be heated to soften the plastic and effect welds between the members.

As indicated heretofore, an important feature of this invention is the provision of the slotted holes 14 which are positioned and dimensioned to receive the rudder vanes 12, which may protrude through the wing members 13. This feature allows the wing members 13 to be drawn straight to the rear such that the wing members 13, in combination with the rudder vanes 12, constitute perpendicular fins that stabilize the aerial toy in the arrow-like mode of flight. The tail-fin combination of the wing members 13 and the rudder vanes 12 give this toy a stability such that it may be aimed and launched on a predictable course. With a bit of practice, the toy may be shot upwardly into the wind such that it will descend toward the launching point or toward any desired point on the ground. Thus the toy may be used solo, returning to the same person who launched it; or alternatively, the toy may be sent from one person to another at a point somewhat remote from the person who launced it.

As shown in FIGURE 2, the resilient wing members 13 will have a natural curl. Thus, the wing members will curve outwardly from the body 11 in an arc when no substantial stresses are placed upon the toy. The natural curl or arcuate form of the wing members 13 will provide the second mode of flight wherein the toy descends as a helicopter.

If a thermal plastic is used in forming the wing member 13, the wings may be heated to form the arcuate curl. The curl may be effected into other material by drawing a blunt edge along the wing members.

As shown in the drawing, the natural curl, or curvature, of the wing members 13 is of a rather long radius. It would also be feasible to form the wing members with relatively straight portions adjacent to the shaft 11 and with relatively straight extremities. In this case, the "curl" of each wing may be in a relatively sharp knee or abrupt curve at a point intermediate between the bend 22 and the ends thereof. Any such abrupt knee or sharp curvature, even a sharp bend about a score line, will be considered to be a "curl" for the purposes of this patent application.

In addition to the arcuate curl, each wing member should be twisted about itself to effect a slight permanent twist. This twist will cause the toy to rotate as a helicopter, as indicated by spiral arrows 25 in FIGURE 2. The slight permanent twist may be set into the plastic material of the wing members 13 during the same operation as setting the arcuate curl therein.

Figure 4:
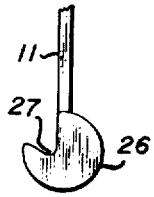
FIGURE 4 is a fragmentary prospective view showing an alternative construction with the forward end of the shaft having an enlarged tip formed thereon.

An alternative tip arrangement is shown in FIGURE 4. In this embodiment of the invention, an enlarged mass 26 is formed integrally with the shaft-like body 11.

The enlarged and more massive tip 26 may be formed in the same molding operation with the body 11. An arcuate groove 27 is formed in the ball tip 26 to provide a hook for engagement with the sling or catapult 15.

The embodiment of FIGURE 4 has an advantage of economy of manufacture, since the enlarged tip is molded together with the body 11, and there is no need for a further step of crimping a metal tip 16 over the forward end of the shaft 11. Because the enlarged tip 26 is relatively massive as compared to the remainder of the body 11, the tip will be properly weighted for stable flight either as an arrow or as a helicopter. Furthermore, the more massive, enlarged tip 26 will receive the impacts of collisions and will protect the remainder of the body 11 from shattering upon impact.

Changes may be made in the form, construction, and arrangement of parts without departing from the spirit of the invention or sacrificing any of its advantages, and the right is hereby reserved to make all such changes as fall within the scope of the following claims.

The invention is claimed as follows:

1. An aerial toy adapted to ascent as an arrow and to descend as a helicopter, said toy consisting of only two parts assembled together, a first of the parts being a plastic shaft having an enlarged forward end and having a rearward end with a pair of outwardly extending rudder vanes formed integrally therewith, the second part being a pair of wing members formed of a single strip of resilient sheet material having a hole and a 180° bend at the midpoint thereof, said shaft inserted through the hole in the wing members, said wing members having elongated openings positioned intermediately between the midpoint bend and the ends thereof, said rudder vanes protruding through the openings at right angles to the wing members, said shaft having studs integrally formed therewith and positioned forwardly of the rudder vanes, said wing members having holes receiving the studs of the shaft which are pressed therein to secure the wing members to the shaft rearwardly of the midpoint bend, said wing members operable to extend straight to the rear during a first mode of flight when the toy ascends as an arrow and wherein said wing members and said rudder vanes provide mutually perpendicular surfaces for stable flight with the surfaces of the rudder vanes being intermediately positioned with respect to the surfaces of the wing members, said wing members further operable to curl outwardly from the shaft during a second mode of flight when the toy descends as a helicopter.

*2. An aerial toy adapted to ascend as an arrow and to descend as a helicopter, said toy consisting of a shaft having an enlarged forward end and having a rearward end with a pair of outwardly extending rudder vanes, a pair of wing members formed of a single strip of resilient sheet material having a hole and a 180° bend at the midpoint thereof, said shaft inserted through said hole in said wing members, said wing members having elongated openings positioned intermediately between said midpoint bend and the ends thereof, said rudder vanes protruding through said openings at right angles to said wing members, means securing said wing members to said shaft rearwardly of said midpoint bend, said wing members operable to extend straight to the rear during a first mode of flight when the toy ascends as an arrow and wherein said wing members and said rudder vanes provide mutually perpendicular surfaces for stable flight with the surfaces of the rudder vanes being intermediately positioned with respect to the surfaces of the wing members, said wing members further operable to curl outwardly from the shaft during a second mode of flight when the toy descends as a helicopter.*

*3. An aerial toy adapted to ascend as an arrow and to descend as a helicopter, said toy consisting of a shaft having an enlarged forward end and having a rearward end with a pair of rudder vanes extending laterally therefrom, a pair of wing members formed of a single strip*

*of resilient sheet material having a hole substantially at the midpoint thereof, said strip being folded back upon itself, said fold extending through said hole, said shaft being inserted through said hole, means attaching said strip to said shaft, one of said wing members extending along one side of said shaft and the other of said wing members extending along the other side of said shaft, each of said wing members having a bend approaching 90° in the midportion thereof so that the free end portions of said wing members normally flare away from said shaft, each of said wing members having an elongated opening through the midportion thereof, said rudder vanes protruding through said openings substantially at right angles to said wing members, means on said shaft securing said wing members to the shaft rearwardly of said midpoint fold, said wing members operable to extend straight to the rear during a first mode of flight when the toy ascends as an arrow and wherein said wing members and said rudder vanes provide mutually perpendicular surfaces for stable flight with the surfaces of the rudder vanes being intermediately positioned with*

*respect to the surfaces of the wing members, the free end portions of said wing members being operable to flare outwardly from said shaft at said bends during a second mode of flight when the toy descends as a helicopter.*

References Cited

The following references, cited by the Examiner, are of record in the patented file of this patent or the original patent.

UNITED STATES PATENTS

| | | |
|---|---|---|
| 1,793,831 | 2/1931 | Worden. |
| 2,417,267 | 3/1947 | Porter. |
| 2,621,441 | 12/1952 | Worden. |

LOUIS G. MANCENE, Primary Examiner.

R. F. CUTTING, Assistant Examiner

U.S. Cl. X.R.

273—106.5